United States Patent [19]

Townsend

[11] Patent Number: 5,083,973
[45] Date of Patent: Jan. 28, 1992

[54] SAFETY METHOD AND MEANS FOR STOPPING MEAT SKINNING MACHINES

[75] Inventor: Ray T. Townsend, Des Moines, Iowa

[73] Assignee: Townsend Engineering Company, Des Moines, Iowa

[21] Appl. No.: 426,668

[22] Filed: Oct. 26, 1989

[51] Int. Cl.⁵ .............................................. A22B 5/16
[52] U.S. Cl. .................................. 452/127; 452/198; 192/131 R; 2/16; 2/167; 2/168
[58] Field of Search ............... 17/21, 50, 52; 192/130, 192/131 R; 2/2, 16, 20, 159, 161 R, 167, 168; 452/125, 127, 198, 133, 136

[56] References Cited

U.S. PATENT DOCUMENTS 2,895,139  7/1959  Compton ............................. 452/121
4,965,909  10/1990  McCullough et al. ............. 452/149

FOREIGN PATENT DOCUMENTS 3501021  7/1985  Fed. Rep. of Germany .......... 17/21

Primary Examiner—Willis Little
Attorney, Agent, or Firm—Zarley, McKee, Thomte, Voorhees & Sease

[57] ABSTRACT

This invention utilizes a conventional meat skinning machine having a frame, an elongated skinning blade, a rotatable gripping roll closely positioned adjacent the blade, an electrical motor operatively connected to the gripping roll and to a source of electrical power, and a danger zone defined by the area approximate to the gripping roll closely adjacent the blade. The motor is a braking motor which has a normally inoperative braking means adapted to stop the motor substantially instantaneously when becoming operative. A safety circuit is electrically connected to the braking motor, the blade and the gripping roll. The safety circuit is normally open and is adapted to be closed when the blade and gripping roll are electrically connected by any electroconducting means, such as an operator's glove made of electroconducting material, that simultaneously comes into electrical contact with the blade and the gripping roll. The closing of the safety circuit causes the braking means to be actuated substantially instantaneously to stop the braking motor and to stop substantially instantaneously any further rotation of the gripping roll. The method of the invention includes connecting the blade, the gripping roll and the braking motor in a normally open safety circuit. The safety circuit is closed by electrically connecting the blade and the gripping roll through placing a glove on the hand of the machie operator comprised of electroconducting material. The rotation of the gripping roll is substantially instantaneously stopped by closing the safety circuit through simultaneously contacting the blade and the gripping roll with the operator's glove.

12 Claims, 1 Drawing Sheet

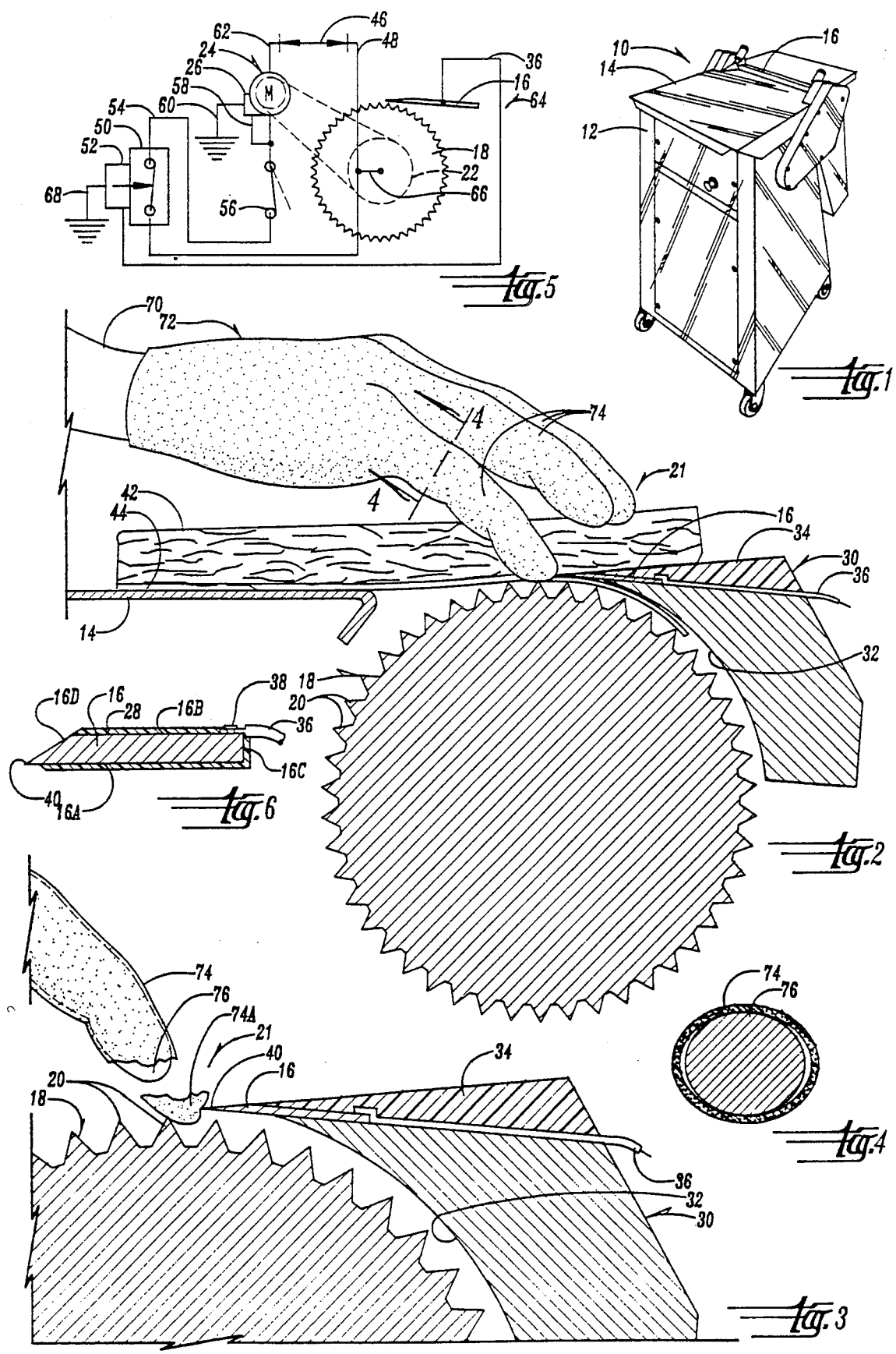

SAFETY METHOD AND MEANS FOR STOPPING MEAT SKINNING MACHINES

BACKGROUND OF THE INVENTION

Meat skinning machines adapted to remove skin or membrane from meat, poultry or fish products have long been in existence. These machines include an elongated sharp skinning blade which is positioned adjacent a gripping roll having a plurality of teeth thereon for pulling the meat product towards the cutting edge of the blade.

Occasionally, the operators of these machines will inadvertently allow their hands or fingers to come in contact with the gripping roll whereby their hands or fingers will be drawn into contact with the skinning blade.

While safety switches and the like have been developed to permit the operator to stop the machine, and hence stop the rotation of the gripping roll, these devices do not always function automatically, and they do not function quick enough to prevent injury to the operator.

Therefore, it is a principal object of this invention to provide a safety method and means for stopping meat skinning machines which will automatically and substantially instantaneously stop the machine when the operator's hands or fingers are in contact with the danger zone that surrounds the gripping roll and the adjacent cutting edge of the skinning blade.

A further object of this invention is to provide a safety method and means for stopping meat skinning machines which employs the use of an operator's glove made of a material capable of conducting electrical current and which is of low tensile portions thereof to be torn away from the glove body when those portions become entangled in the teeth of the gripping roll.

These and other objects will be apparent to those skilled in the art.

BRIEF SUMMARY OF THE INVENTION

This invention utilizes a conventional meat skinning machine having a frame, an elongated skinning blade, a rotatable gripping roll closely positioned adjacent the blade, an electrical motor operatively connected to the gripping roll and to a source of electrical power, and a danger zone defined by the area approximate to the gripping roll closely adjacent the blade. The motor of this invention is a braking motor which has a normally inoperative braking means adapted to stop the motor substantially instantaneously when becoming operative. A safety circuit is electrically connected to the braking motor, the blade and the gripping roll. The safety circuit is normally open and is adapted to be closed when the blade and gripping roll are electrically connected by any electroconducting means, such as an operator's glove made of electroconducting material, that simultaneously comes into electrical contact with the blade and the gripping roll. The closing of the safety circuit causes the braking means to be actuated substantially instantaneously to stop the braking motor and to stop substantially instantaneously any further rotation of the gripping roll.

The method of the invention includes connecting the blade, the gripping roll and the braking motor in a normally open safety circuit. The safety circuit is closed by electrically connecting the blade and the gripping roll through placing a glove on the hand of the machine operator comprised of electroconducting material. The rotation of the gripping roll is substantially instantaneously stopped by closing the safety circuit through simultaneously contacting the blade and the gripping roll with the operator's glove.

A BRIEF DESCRIPTION OF THE DRAWINGS

FIG. 1 is a perspective view of the skinning machine of this invention;

FIG. 2 is an enlarged scale sectional view taken through the danger zone and showing the interrelationship of the skinning blade, the gripping roll and the operator's hand in an emergency situation;

FIG. 3 is an enlarged scale sectional view similar to that of FIG. 2 but shows how a portion of the operator's glove is broken away as the operator withdraws his hand when the tip of the fingers of the glove come in contact with the teeth of the gripping roll and the cutting edge of the blade;

FIG. 4 is a sectional view taken on line 4—4 of FIG. 2;

FIG. 5 is a schematic wiring diagram of this invention; and

FIG. 6 is an enlarged scale sectional view taken through the cutting blade of this invention.

DESCRIPTION OF THE PREFERRED EMBODIMENT

The numeral 10 designates a meat skinning machine having a frame 12, an upper table 14, an elongated cutting blade 16, and a rotatably mounted gripping roll 18 having a plurality of sharp teeth 20 on its outer surface. The numeral 21 (FIGS. 2 and 3) designates a danger zone defined by the adjacent relationship of the cutting blade and the gripping roll.

A conventional drive belt 22 (FIG. 5) connects brake motor 24 with gripper roll 18 so that the motor can provide rotational motion to the gripping roll. Brake motor 24 has a solenoid control 26 which, as described hereafter, is capable of imposing substantially instantaneous braking action to the output shaft of the motor whenever the motor is deprived of electrical power.

As best shown in FIG. 6, blade 16 has a bottom surface 16A, a top surface 16B, a rear edge 16C, and a tapered forward portion 16D. The bottom surface, top surface, and rear edge are covered with an electrical insulating material 28 comprised of lacquer, ceramic, teflon, or the like.

With reference to FIGS. 2 and 3, the skinning machine comprises a conventional shoe 30 having an inner arcuate surface 32 which is complimentary in shape to the outer surface of gripping roll 18. A conventional blade clamping plate 34 is mounted over blade 16 which is secured between plate 34 and shoe and 30. An electrical lead 36 is secured to blade 16 by a rivot 38 or the like (FIG. 6). The tapered forward portion 16D of blade 16 terminates in cutting edge 40.

With reference to FIG. 2, meat 42 with skin 44 thereon is shown to be conventionally passed over the gripping roll 18 into contact with the cutting edge 40 of blade 16 to sever the skin 44 from the meat. The skin 44 passes downwardly between the gripping roll and the arcuate inner surface 32 of shoe 30. The term meat as used herein is understood to include meat, poultry and fish products.

With reference to FIG. 5, the numeral 46 designates an electrical power source. Hot lead 48 extends from the power source and is connected to normally closed relay 50 which has normally dormant solenoid 52 secured thereto. Lead 54 connects relay 50 with motor 24. Master control switch 56 is imposed within lead 54. Lead 58 interconnects lead 54 and solenoid 26 on braking motor 24. Ground lead 60 extends from solenoid 26 to a suitable ground connection. Return lead 62 connects motor 24 with the power source 46. Thus, in normal operation, the operator closes switch 56 which causes current to flow through lead 48, relay 50, lead 54, motor 24 and return lead 62. Current also flows from lead 54 through solenoid 26 to ground connection 60. Solenoid 26 holds the braking mechanism of motor 24 in an inoperative condition so that the motor 24 is free to rotate and is free to operate to rotate gripping roll 18 through belt 22 in conventional fashion.

A safety circuit 64 is comprised of lead 66 which extends from lead 48 to a rotatable electrical connection with gripping roll 66. A safety circuit also includes lead 36 extending from blade 16 for connection to solenoid 52 on relay 50. Ground lead 68 connects solenoid 52 to a suitable ground connection.

With reference to FIGS. 2 and 3, the numeral 70 designates the hand of the operator upon which a glove body 72 is imposed. Glove body 74 has conventional finger portions 74. The numeral 74A in FIG. 3 denotes a detached finger portion of the glove body 72. The operator's fingers are denoted by the numeral 76. The brake motor 24 is of conventional construction and is available from Baldor Electric Co., Model LC0044.

Glove body 72 is comprised of a material having low tensile strength such as foam rubber or the like. Glove body should be impregnated with conductive carbon or the like so that it is capable of conducting electrical current.

In operation, the operator closes master switch 56, as described above, to cause motor 24 to rotate gripping roll 18. With reference to FIG. 2, if the operator's hand or fingers simultaneously contact the gripping roll and the non-insulated cutting edge of blade 16, the safety circuit 64 is closed because electrical current will flow from lead 48 through lead 66, through gripping roll 18, through skinning blade 16, and thence through lead 36 to solenoid 52. Solenoid 52 will then be electrically actuated as the current passes to ground 68. Upon becoming electrically actuated, solenoid 52 will cause the relay 50 to open, whereupon electrical current will no longer flow from the source of electrical power 46 through lead 48, and thence through lead 54 to motor 24. When lead 54 thereupon becomes deenergized, solenoid 26, which derives its power from lead 54 and lead 58, will also become de-energized, and the braking mechanism in motor 24 will then become operative through spring action or the like. The output shaft of motor 24 will instantaneously stop, whereupon rotational power through belt 22 to gripping roll 18 will also be instantaneously stopped. Thus, the fingers or hand of the operator will not be drawn into the cutting blade by the gripping roll 18.

Whenever an operator's hand moves into the danger zone 21 as shown in FIG. 2 the operator instinctively seeks to withdraw his or her hand. With a heavy glove, a gripping roll may entangle such a glove and continue to pull the hand of the operator into the blade in spite of the operator's efforts to withdraw the hand. However, with the fragile fabric of the glove of this invention, the entangled portion 74A of the glove will easily tear away from the remainder of the glove (FIG. 3) to permit the operator to easily withdraw the hand from the danger zone.

It is therefore seen that the method and means of this invention will function automatically and will serve to instantaneously stop the skinning machine, and the gripping roll thereof, whenever the electroconducting glove closes the safety circuit by simultaneously contacting the gripping roll and the exposed cutting edge of the blade 16.

It should be noted that while the preferred embodiment of this invention contemplates that the gripping roll and the cutting edge of the blade will function as the electroconducting elements which are interconnected by the electroconducting glove, other such components capable of conducting electricity, such as a blade clamping plate 34 capable of conducting electricity, could be employed without departing from this invention.

I claim:

1. A meat skinning machine having a frame, an elongated skinning blade, a rotatable gripping roll closely positioned adjacent said blade, and an electrical motor operatively connected to said gripping roll and to a source of electrical power, the improvement comprising, said motor being a braking motor having a normally inoperative breaking means adapted to stop said motor substantially instantaneously when becoming operative, a safety circuit electrically connecting said braking motor, said blade and said gripping roll said safety circuit normally being open and adapted to be closed when said blade and said gripping roll are electrically connected by an electroconducting glove on the hand of a machine operator, and which is free from being hard-wired connected to said machine, that simultaneously comes into electrical contact with said blade and said gripping roll, whereupon said braking means will be actuated substantially instantaneously to stop said braking motor and to stop substantially instantaneously the rotation of said gripping roll, said electroconducting glove comprising the only electroconducting means between said operator and said machine.

2. The device of claim 1 wherein said blade has an elongated cutting edge, and said blade has an insulated coating thereover except for said cutting edge.

3. The device of claim 1 wherein said safety circuit separates said braking motor from said source of electrical power when said blade and said gripping roll are electrically connected.

4. A meat skinning machine having a frame, an elongated skinning blade, a rotatable gripping roll closely positioned adjacent said blade, and an electrical motor operatively connected to said gripping roll and to a source of electrical power and a danger zone defined by the area proximate to said gripping roll closely adjacent said blade, the improvement comprising, said motor being a braking motor having a normally inoperative breaking means adapted to stop said motor substantially instantaneously when becoming operative, spaced apart electroconducting members on said machine in said danger zone, a safety circuit electrically connecting said braking motor and said electroconducting members, a safety circuit normally being open and adapted to be closed when said electroconducting members are electrically connected by an electroconducting glove on the hand of a machine operator, and which is free from being hard-wired connected to said machine, that simultaneously comes into electrical contact with said electroconducting members, whereupon said braking means will be actuated substantially instantaneously to stop said braking motor and to stop substantially instantaneously the rotation of said gripping roll, said electroconducting glove comprising the only electroconducting means between said operator and said machine.

5. The device of claim 3 wherein said safety circuit separates said braking motor from said source of electrical power when said electroconducting members are electrically connected.

6. A meat skinning machine having a frame, an elongated skinning blade, a rotatable gripping roll closely positioned adjacent said blade, and an electrical motor operatively connected to said gripping roll and to a source of electrical power and a danger zone defined by the area proximate to said gripping roll closely adjacent said blade, the improvement comprising, said motor being a braking motor having a normally inoperative breaking means adapted to stop said motor substantially instantaneously when becoming operative, an electroconducting means on said machine in said danger zone, a safety circuit electrically connecting said braking motor and said electroconducting members, a safety circuit normally being open and adapted to be closed when said electroconducting members are electrically connected by an electroconducting glove on the hand of a machine operator, and which is free from being hard-wired connected to said machine, that simultaneously comes into electrical contact with said electroconducting members, whereupon said braking means will be actuated substantially instantaneously to stop said braking motor and to stop substantially instantaneously the rotation of said gripping roll, said safety circuit normally being open and adapted to be closed when said electroconducting means in said danger zone is electrically contacted by any second electroconducting means that comes into contact with said first-mentioned electroconducting means, whereupon said braking means will be actuated substantially instantaneously to stop said braking motor and to stop substantially instantaneously the rotation of said gripping roll, said electroconducting glove comprising the only electroconducting means between said operator and said machine.

7. The method of stopping a meat skinning machine having an elongated skinning blade, a rotatable gripping roll closely positioned adjacent said blade, and an electrical motor operatively connected to said gripping roll, comprising, connecting said blade, said gripping roll and said motor in a normally open safety circuit to be closed by electrically connecting said blade and said gripping roll, placing an electroconducting glove on the hand of the machine operator comprised of electroconducting material, said closing said safety circuit by simultaneously contacting said blade and said gripping roll with said electroconducting glove to close said safety circuit to substantially instantaneously stop the rotation of said gripping roll, whereby said electroconducting glove comprises the only electroconducting means between said operator and said machine.

8. The method of stopping a meat skinning machine having an elongated skinning blade, a rotatable gripping roll closely positioned adjacent said blade, and an electrical motor operatively connected to said gripping roll, an electroconducting means on said machine in said danger zone, comprising, connecting said electroconducting means and said motor in a normally open safety circuit to be closed by electrically contacting said electroconducting means in said danger zone placing an electroconducting glove free from electrical connection to said machine on the hand of the machine operator comprised of electroconducting material whereby said electroconducting glove comprises the only electroconducting means between said operator and said machine and closing said safety circuit by contacting said electroconducting means with said glove to substantially instantaneously stop the rotation of said gripping roll.

9. A safety glove for use by operators of power machines, comprising, a glove body member, said glove body member being comprised of an electrically conductive rubber material.

10. The glove of claim 9 wherein said glove body member is foam rubber material.

11. The glove of claim 9 wherein said glove body member is impregnated with conductive carbon.

12. A meat skinning machine having a frame, an elongated skinning blade, a rotatable gripping roll closely positioned adjacent said blade, and an electrical motor operatively connected to said gripping roll and to a source of electrical power and a danger zone defined by the area proximate to said gripping roll closely adjacent said blade, the improvement comprising, electrically operated rotational control means operatively connected to said motor to normally permit said motor to rotate said gripping roll when operational, spaced apart electroconducting members on said machine in said danger zone, a safety circuit electrically connecting said motor, said rotational control means, and said electroconducting means, to control said rotational control means, said rotational control means adapted to stop the rotation of said gripping roll when said electroconducting members are electrically connected by an electroconducting glove on the hand of a machine operator, and which is free from being hard-wired to said machine, that simultaneously comes into contact with said electroconducting members; wherein said electroconducting glove comprises the only electroconducting means between said operator and said machine was inserted.

* * * * *

UNITED STATES PATENT AND TRADEMARK OFFICE
CERTIFICATE OF CORRECTION

PATENT NO. : 5,083,973
DATED : January 28, 1992
INVENTOR(S) : Ray T. Townsend

It is certified that error appears in the above-indentified patent and that said Letters Patent is hereby corrected as shown below:

Column 6, line 67, delete "was inserted".

Signed and Sealed this

Thirty-first Day of August, 1993

Attest:

BRUCE LEHMAN

Attesting Officer     Commissioner of Patents and Trademarks